United States Patent
Kennedy, Jr.

(10) Patent No.: US 6,871,077 B2
(45) Date of Patent: Mar. 22, 2005

(54) SYSTEM AND METHOD FOR GEOLOCATING A WIRELESS MOBILE UNIT FROM A SINGLE BASE STATION USING REPEATABLE AMBIGUOUS MEASUREMENTS

(75) Inventor: Joseph P. Kennedy, Jr., Great Falls, VA (US)

(73) Assignee: Grayson Wireless, Reston, VA (US)

( * ) Notice: Subject to any disclaimer, the term of this patent is extended or adjusted under 35 U.S.C. 154(b) by 654 days.

(21) Appl. No.: 09/971,680

(22) Filed: Oct. 9, 2001

(65) Prior Publication Data
US 2003/0069024 A1 Apr. 10, 2003

(51) Int. Cl.⁷ .............................................. H04Q 7/20
(52) U.S. Cl. ................ 455/456.5; 455/456.1; 455/561; 342/463
(58) Field of Search ...................... 455/456.1–456.6, 455/561; 342/457, 463.5, 387

(56) References Cited

U.S. PATENT DOCUMENTS

| | | |
|---|---|---|
| 4,728,959 A | 3/1988 | Maloney et al. |
| 4,845,504 A | 7/1989 | Roberts et al. |
| 4,891,650 A | 1/1990 | Sheffer |
| 5,056,106 A | 10/1991 | Wang et al. |
| 5,218,618 A | 6/1993 | Sagey |
| 5,317,323 A | 5/1994 | Kennedy et al. |
| 5,327,144 A | 7/1994 | Stilp |
| 5,365,544 A | 11/1994 | Schilling |
| 5,404,376 A | 4/1995 | Dent |
| 5,506,864 A | 4/1996 | Schilling |
| 5,508,708 A | 4/1996 | Ghosh et al. |
| 5,512,908 A | 4/1996 | Herrick |
| 5,515,419 A | 5/1996 | Sheffer |
| 5,519,760 A | 5/1996 | Borkowski et al. |
| 5,592,180 A | 1/1997 | Yokev et al. |
| 5,675,344 A | 10/1997 | Tong et al. |
| 5,736,964 A | 4/1998 | Ghosh et al. |
| 5,914,687 A | 6/1999 | Rose |
| 5,945,948 A | 8/1999 | Buford et al. |
| 5,959,580 A | 9/1999 | Maloney et al. |
| 5,970,413 A | 10/1999 | Gilhousen |
| 6,047,192 A | 4/2000 | Maloney et al. |
| 6,097,336 A | 8/2000 | Stilp |
| 6,104,344 A * | 8/2000 | Wax et al. .................. 342/378 |
| 6,104,345 A * | 8/2000 | Tweg et al. ................. 342/417 |
| 6,108,555 A | 8/2000 | Maloney et al. |
| 6,108,557 A | 8/2000 | Wax et al. |
| 6,119,013 A | 9/2000 | Maloney et al. |
| 6,127,975 A | 10/2000 | Maloney |
| 6,184,829 B1 | 2/2001 | Stilp |
| 6,249,680 B1 * | 6/2001 | Wax et al. ............... 455/456.2 |
| 6,281,834 B1 | 8/2001 | Stilp |
| 6,288,675 B1 | 9/2001 | Maloney |
| 6,288,676 B1 | 9/2001 | Maloney |
| 6,317,081 B1 | 11/2001 | Stilp |
| 6,317,604 B1 | 11/2001 | Kovach, Jr. et al. |
| 6,334,059 B1 | 12/2001 | Stilp et al. |
| 6,366,241 B2 | 4/2002 | Pack et al. |
| 6,400,320 B1 | 6/2002 | Stilp et al. |

(List continued on next page.)

Primary Examiner—William Trost
Assistant Examiner—Marcos L Torres
(74) Attorney, Agent, or Firm—Duane Morris LLP

(57) ABSTRACT

A system and method for geolocating a mobile unit from a single base station is described. Communication signals and pilot signal information from a mobile unit are received at a base station with randomly-located antennas. Certain parameters of the signals are detected and a set of real-time, but ambiguous, location measurements is determined. The real-time measurements are compared to reference measurements previously stored in a database, indexed by range and bearing from the base station, to find the best match and thereby the geolocation of the mobile unit. A time history of the mobile unit's position is stored and compared with static information from maps and other geomorphological data to further refine the geolocation of the mobile unit.

74 Claims, 7 Drawing Sheets

U.S. PATENT DOCUMENTS 6,456,852 B2 * 9/2002 Bar et al. ................ 455/456.1
6,463,290 B1    10/2002 Stilp et al.
6,496,701 B1 * 12/2002 Chen et al. ............. 455/456.5
6,580,911 B1 *  6/2003 Clancy ...................... 455/446
6,646,604 B2   11/2003 Anderson
6,771,971 B2 *  8/2004 Smith ..................... 455/456.1

* cited by examiner

SYSTEM AND METHOD FOR GEOLOCATING A WIRELESS MOBILE UNIT FROM A SINGLE BASE STATION USING REPEATABLE AMBIGUOUS MEASUREMENTS

BACKGROUND OF THE INVENTION

The present invention generally relates to geolocating a mobile unit from a single base station by relying on the repeatability of measurements made in the geographic operating area of the base station. More specifically, the invention is an infrastructure-based system and method, utilizing a base station having randomly located antennas, which uses a database of previously-determined ambiguous measurements, such as lines of bearing, serving base station pilot signal data for the sector in which the mobile unit is located as well as for the other sectors of the serving base station and neighbor base station pilot signal data, all of which are measured at the mobile unit from forward traffic channels (collectively, the serving base station pilot signal data and the neighbor pilot signal data are referred herein as the "pilot signal set"), and pilot finger data measured at the serving base station from the reverse traffic channel. This data is taken from a test unit at known locations throughout the geographic area served by the base station. The database is indexed with the known range and/or bearing from the base station to the test unit. The real-time ambiguous measurements are then compared with the reference ambiguous measurements in the database to thereby determine the geolocation of the mobile unit.

As used herein, the term "mobile unit" includes, but is not limited to, a mobile phone, tracking device, locating device, or any other wireless device that is in two-way communication with at least one base station. Examples of mobile units are mobile phones, vehicle location devices, fleet vehicle tracking devices, personal medical emergency transmitters, and other like devices. The term "infrastructure based" refers to systems and methods for geolocation where the measurements that are taken for geolocating the mobile unit are taken at the base station, switching office, or other typically non-mobile asset of the communication system. The term "randomly located antennas" refers to a group of antennas that are not in a predetermined pattern, such as an antenna array. The term "ambiguous measurements" refers to measurements whose values, either because of the method of obtaining the measurements or the nature of the measurements themselves, cannot be simply plugged into a mathematical equation to determine a unique geolocation. However, the ambiguous measurements are a function of the location of the transmitting device, either a mobile unit or a test unit, and are therefore repeatable. The present invention exploits the repeatability of the ambiguous measurements in order to obtain a geolocation estimate. The term "geomorphological data" includes, but is not limited to terrain features, buildings, road systems, etc. A "forward traffic channel" refers to communication signals being sent from a base station to a mobile unit while a "reverse traffic channel" refers to communication signals being sent from a mobile unit to a base station. The "serving base station" is the base station to which the mobile unit is sending its reverse traffic.

The term "pilot signal data" refers to data received at the mobile unit from the serving base station and neighboring base stations. As is know in the art, pilot signal data is unique for each base station, and each base station sector, and includes power level and timing information which the present invention exploits to determine a range from the mobile unit to the base stations as well as for defining a subregion of the serving base station's serving sector as will be described in detail below. The mobile unit scans for all detectable pilot signals as part of its normal operations. If the mobile unit detects a pilot signal from a neighboring base station, the mobile unit measures the power level and timing of the neighboring base station's pilot signal compared to the pilot signal of he serving base station.

The term "pilot finger data" refers to data derived from the set of correlators that try to despread communication traffic. The correlators are referred to in the art as "fingers". The fingers can lock onto the direct path communication signal or multipath versions of the communication signal. A set of fingers are located at the mobile unit and at each base station. The data from the fingers includes received power and timing. The present invention uses the timing information at the serving base station in the calculation of range to the mobile unit as described further below. Current CDMA protocols may not allow for the transmission of pilot finger data from the mobile unit to the base station. However, the present invention contemplates the use of pilot finger data from the mobile unit in the determination of the geolocation of the mobile unit.

The present invention differs from other geolocation systems in one or more ways. Some prior art systems are mobile unit-based and determine the position of the mobile unit by receiving multiple dedicated location signals either from components outside the mobile unit's communication system, such as satellites and GPS systems or from a network of dedicated land-based antennas. Other prior art geolocation systems that are infrastructure-based use combinations of specific, as opposed to ambiguous, measurements generally from multiple base stations, such as angle of arrival, time of arrival, and time difference of arrival. These specific measurement values are used to solve a mathematical equation to determine the location of the mobile unit.

One prior art example of geolocation is based on time difference of arrival ("TDOA") of radio signals at a plurality of base stations. Typical TDOA systems are described in U.S. Pat. No. 5,327,144 to Stilp, et al. and U.S. Pat. No. 5,317,323 to Kennedy, et al. for which the present inventor is a co-inventor. TDOA systems, such as the two previously mentioned and others, measure the time of arrival at a single antenna at a plurality of base stations of a radio signal emitted by a transmitter. The time of arrival is used to define sets of hyperbolic surfaces defining possible locations of the transmitter between each pair of base stations receiving the radio signal. The intersection of these hyperbolic surfaces define the location of the transmitter. The underlying technique of TDOA systems relies on geometric equations and the constant speed of the radio signal.

Another prior art example of geolocation is based on direction finding ("DF") or lines of bearing ("LOB"). A typical LOB system is described in U.S. Pat. No. 4,728,959 to Maloney, et al. LOB systems determine the angle of arrival of the received wavefront of a radio signal emitted by a transmitter. The wavefront is received by an antenna array at a plurality of base stations. The antenna array must be of known dimensions, i.e., the distances between the antenna elements of the array must be known in order to determine the angle of arrival of the wavefront. The angle of arrival for each base station is determined by a radio wave phase difference at the antenna array as measured by the different antenna elements of the array thereby resulting in a line of bearing from the base station to the transmitter. The intersection of the lines of bearing from the plural base stations define the location of the transmitter. The underlying technique of LOB systems relies on geometric equations, the constant speed of the radio signal, and the relationship between the speed of the radio signal, the frequency of the radio signal, and the wavelength of the radio signal.

A third example of prior art geolocation is based on determining the distance of a transmitter from plural base stations. One method of obtaining the distance between a transmitter and a base station is two-way ranging. A typical two-way ranging system is described in U.S. Pat. No. 5,506,864 to Schilling. Two-way ranging entails sending a signal from a base station at a first known time to the transmitter, upon receipt of the signal the transmitter sends a signal back to the base station. The base station receives the transmitter's signal at a second known time, determines the difference between the first known time and the second known time, and calculates the distance between the base station and the transmitter. The result is a ring about the base station of possible locations for the transmitter. The intersection of rings from a number of base stations defines the location of the transmitter. The underlying technique of two-way ranging systems relies on the constant speed of the radio signals emitted by the base station and the transmitter. Some prior art systems use the same technique over time to determine successive loci of points in order to locate the transmitter.

A fourth prior art system uses signature matching to geolocate a mobile transmitter. One such system is described in U.S. Pat. No. 6,108,557 to Wax, et al. ("Wax"). The system described in Wax uses multipath signal signatures received at a base station from a transmitter and compares the received signal signature with a previously-determined set of reference signal signatures. Wax then performs several different specific mathematical matching techniques in order to determine the geolocation of the transmitter. The system and method described in Wax require, among other things, (1) that the base station have an antenna array of known dimensions, (2) specific mathematical matching techniques be used to determine geolocation from a set of possible geolocation solutions, and (3) only the signal envelope be present, i.e., the data contained in the signal is not a factor in determining the geolocation of the transmitter.

All of the above-described prior art systems rely on one or more of the following techniques and/or systems in order to geolocate a transmitter: taking measurements using calibrated antenna systems, using known geometric equations, specific mathematical pattern matching techniques to choose between possible geolocation solutions, and known physical laws. Additionally, all the above-described systems operate on the signal envelope, i.e., each prior art system only requires that a signal from the transmitter to be located be present and ignore the data that the signal carries. None of the prior art systems make use of the wealth of data carried by the signal. This wealth of data in the base station's and/or mobile unit's transmitter signals is useful in obtaining a more efficient and effective geolocation.

The present invention overcomes the deficiencies in the prior art by determining the geolocation of a mobile unit from a randomly-located group of antennas, such as the random grouping of antennas that might be found at a standard base station. An embodiment of the present invention uses the data contained in the signal from the mobile unit in order to determine the geolocation of the mobile unit. The present invention may also compare the time history of geolocation estimates to static information from maps and other geomorphological data to further refine the geolocation of the mobile unit.

Accordingly, it is an object of the present invention to obviate many of the above limitations in the prior art and to provide a novel system and method for geolocating a mobile unit from a single base station by relying on the repeatability of ambiguous measurements of the communication signals and pilot signal data transmitted by the mobile in the geographic area covered by the base station.

It is another object of the present invention to provide a novel system and method for geolocating a mobile unit from a single base station using an infrastructure-based system by comparing real-time measurements from the mobile unit which are a function of geographic position with a database of previously-received reference measurements.

It is yet another object of the present invention to provide a novel system and method for geolocating a mobile unit with a single base station having randomly located antennas where the system and/or method includes comparing real-time ambiguous lines of bearing with reference ambiguous lines of bearing.

It is still another object of the present invention to provide a novel system and method for geolocating a mobile unit with a single base station where the system and/or method includes comparing real-time pilot signal data with reference pilot signal data.

It is a further object of the present invention to provide a novel system and method for geolocating a mobile unit with a single base station where the system and/or method includes comparing real-time pilot finger data with reference pilot finger data.

It is yet a further object of the present invention to provide a novel system and method for geolocating a mobile unit with a single base station by performing a database search in order to match real-time ambiguous measurements with reference ambiguous measurements where the reference ambiguous measurements are indexed in the database by range and bearing from the base station.

It is still a further object of the present invention to provide a novel system and method for geolocating a mobile unit communicating with a single base station using a CDMA protocol.

It is an additional object of the present invention to provide a novel system and method for geolocating a mobile unit communicating with a single base station using a TDMA protocol. For TDMA air interfaces, pilot signal data and pilot finger data is composed of serving base station power and slot timing related information, and neighbor base station power and slot timing information.

It is yet an additional object of the present invention to provide a novel system and method for geolocating a mobile unit with an infrastructure-based location system at a base station where the antennas on the base station are not calibrated for direction-finding.

It is still an additional object of the present invention to provide a novel system and method for geolocating a mobile unit communicating with at least one base station using a communication protocol which requires spreading where the system and/or method includes the use of at least one of the number of signal elements being despread, the time delay between the receipt of direct path and multipath signals, and the power level of the mobile unit.

It is a further additional object of the present invention to provide a novel system and method for geolocating a mobile unit from at least one base station including estimating the geolocation of the mobile unit and comparing the estimated geolocation with static information to thereby refine the estimated geolocation of the mobile unit.

It is yet a further additional object of the present invention to provide a novel system and method for geolocating a mobile unit from a single base station by measuring certain parameters of the communication signal and pilot signal data of the mobile unit to thereby identify an ambiguous position estimate, compare the ambiguous position estimate with a database of reference ambiguous estimates to thereby determine the geolocation of the mobile unit without having to calculate the geolocation from a mathematical expression containing the measured parameters.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

With reference to the drawings, like numerals represent like components throughout the several drawings.

Figure 1:
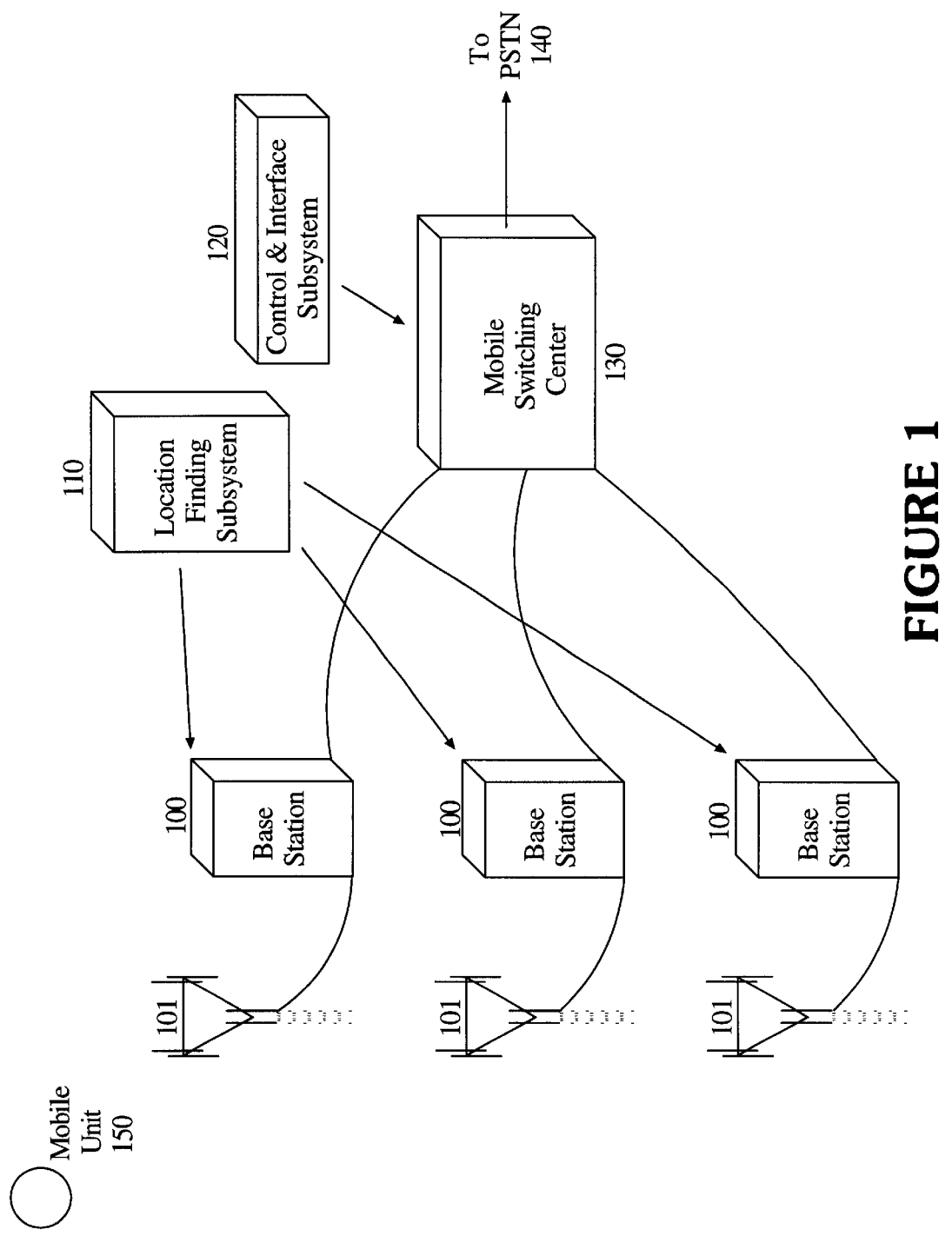
FIG. 1 is a block diagram depicting the geolocation overlay, i.e., the geolocation components to be added to an existing set of base stations and associated mobile switching center.

With reference now to FIG. 1, a typical mobile communication system is depicted including three base stations 100 each with a group of antennas 101. The base stations are connected to a mobile switching center 130 which is an interface between the mobile communication system and the public switched telephone network ("PSTN") 140. The present invention may operate in any mobile communication system with any number of base stations and is not limited to a system with three base stations. The antennas transmit to and receive from mobile units, such as the mobile unit 150, wireless communication signals and pilot signals. As used herein, communication signals refer to forward (base station to mobile) and reverse (mobile to base station) signals containing communication information such as voice or data, being transmitted between, for instance, a calling and called party. Pilot signals refer to signals carrying information about the operation of the wireless system, such as synchronization signals, hand-off signals, power levels, timing, and other typical control information. For communications from a mobile unit to the PSTN 140, the base stations 100 process the information received by the associated antennas 101 and forward the received communication information to the mobile switching center 130, which acts as an interface to the PSTN 140. Communications also typically occur in the opposite direction, i.e., from the PSTN to the mobile unit, and traverse the same path but in the opposite direction.

According to the present invention, a Location Finding Subsystem 110 is preferably located at each base station for which geolocation events are intended. The Location Finding Subsystem, as described in more detail later, connects to the existing antenna and radio frequency ("RF") distribution hardware 105 and the channel bank interface 108 at the base station. The Location Finding Subsystem comprises radio receiving equipment, signal processing equipment, and general purpose computer equipment. The Control and Information Subsystem 120 is located at the mobile switching center and serves as a communications, control, and interfacing hub for the geolocation overlay. The Control and Information Subsystem 120 may function to cross check and correct geolocation estimates for mobile units which are in soft hand-off between base stations as will be described in more detail below.

Figure 2:
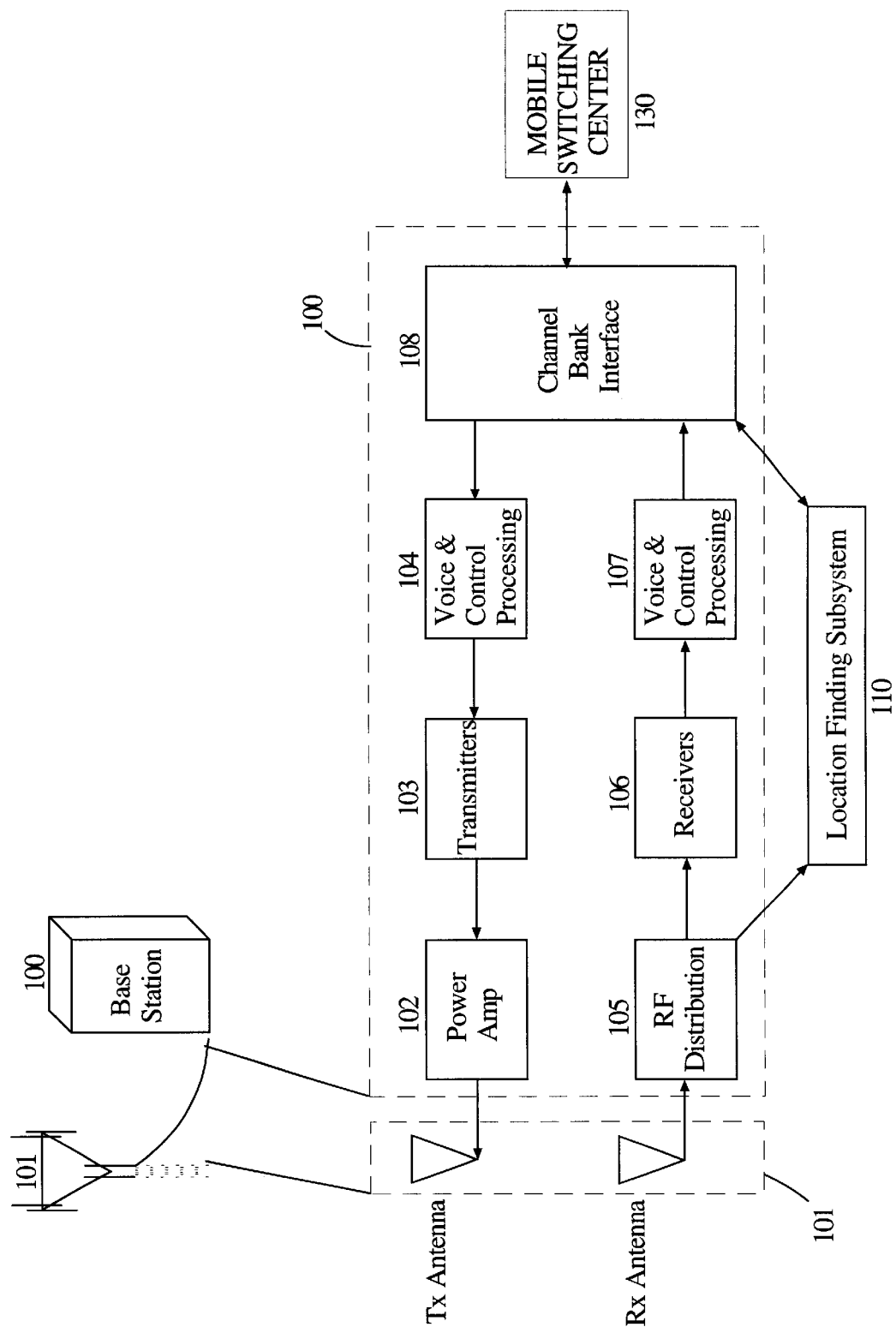
FIG. 2 is a functional block diagram showing the addition of the Location Finding Subsystem of the geolocation device to existing base station equipment.

Directing attention now to FIG. 2, the interface of the Location Finding Subsystem 110 to the base station equipment is shown. A typical base station 100 is connected to at least one transmit ("TX") antenna and at least one receive ("RX") antenna as shown. The base station typically includes, in the transmit path, a power amplifier 102, transmitters 103, and voice and control processing equipment 104 connected as shown. The base station also typically includes, in the receive path, a RF distribution equipment 105, receivers 106, and voice and control processing equipment 107 connected as shown. Both the transmit path and the receive path connect to the channel bank interface equipment 108 which interfaces with the mobile switching center 130 as shown. As indicated in FIG. 2, the Location Finding Subsystem 110 connects to the receive path at the RF distribution equipment block 105 and the channel bank interface equipment block 108.

Figure 3:
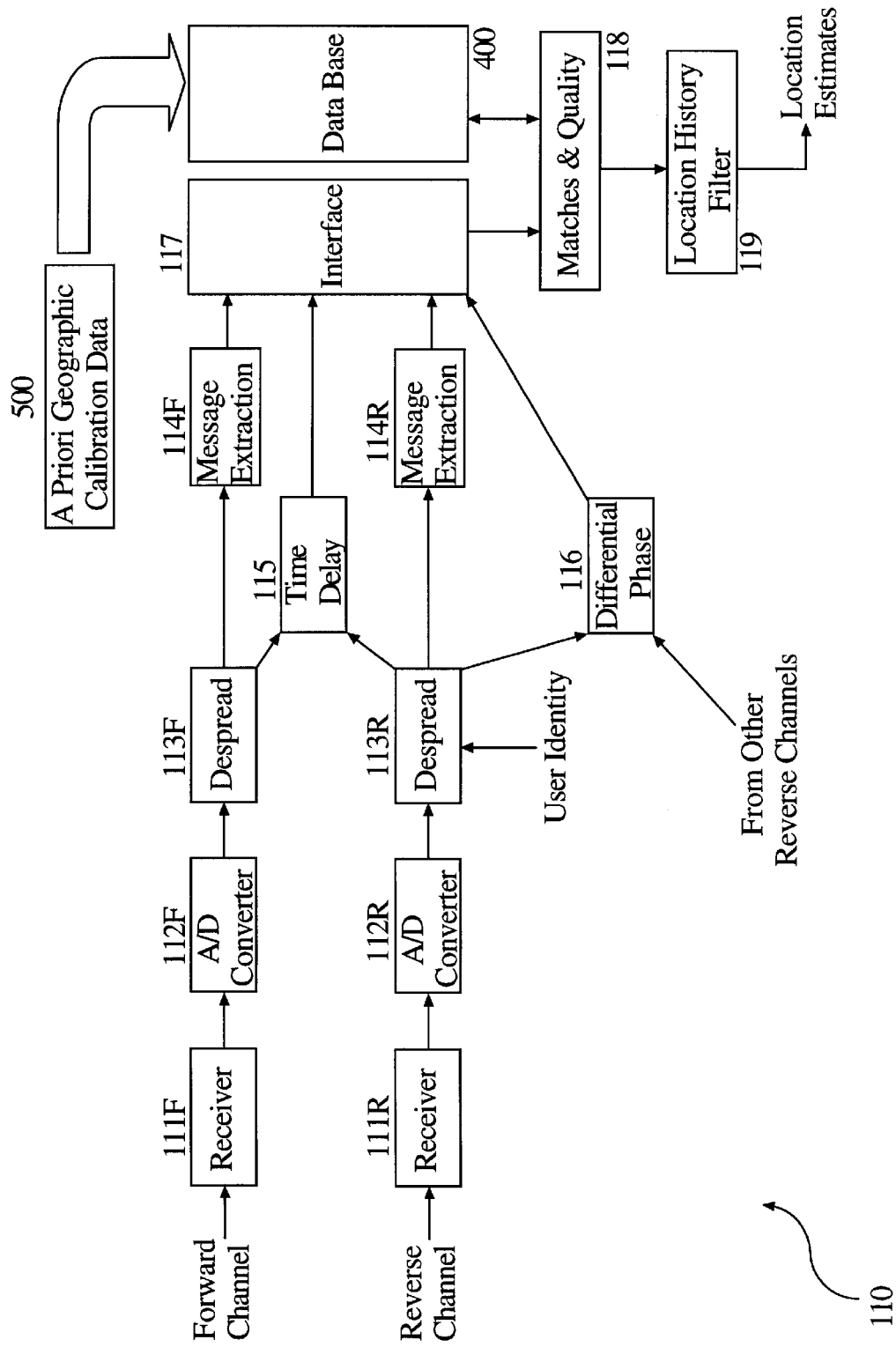
FIG. 3 is a more detailed functional block diagram showing the subsystems of the Location Finding Subsystem as added to existing base station equipment.

FIG. 3 is a more detailed functional block diagram of the Location Finding Subsystem 110. To each transmit path at a base station would be added the forward channel equipment 111F-114F. Similarly, to each receive path at a base station would be added the reverse channel equipment 111R-114R. As indicated in FIG. 3, the forward and reverse channel equipment comprises receiver 111F and 111R, A/D converter 112F and 112R, despreader 113F and 113R where despreader 113R has an additional input for the identity of the user derived from standard base station equipment, and message extractor 114F and 114R. Embodiments of the present invention that do not operate in a communication channel requiring spreading, the despreaders would be excluded. Also included between the forward and reverse channel equipment added is time delay equipment 115 which is used to determine the delay between certain signals sent out on the forward channel and received on the reverse channel to determine, for example, a two-way range between the mobile unit and the base station. Additionally, the differential phase equipment 116 is used to determine the differential phase between direct path and multipath signals received on the various receive antennas at the base station, which is used to determine radial lines of bearing from the base station to the mobile unit.

As stated above, each transmit and receive path at the base station will have added to it the equipment shown in FIG. 3 as 111F/111R to 114F/114R, respectively, as well as the time delay equipment 115 between the transmit and receive paths and the differential phase equipment 116. For a typical sectored base station, there are three sectors each of approximately 120° each with two receive paths and one transmit path for a total of six receive paths and three transmit paths for the base station. The base station provides a unique pilot signal for each sector of its operating area. The forward channel equipment added to the transmit paths is used to synchronize to the pilot/synch channels used by the base station and the mobile units in communication with the base station, and to detect messages on the paging and forward traffic channels. The reverse channel equipment added to the receive paths is used to decode messages on the access channels and reverse traffic channels and to provide high fidelity digitized reverse channel waveforms for measuring two-way transit time and inter-antenna element differential phase.

With continuing reference to FIG. 3, the interface block 117 accepts input data from the forward channel equipment via the message extractor 114F, the reverse channel equipment via the message extractor 114R, as well as from the time delay equipment 115 and the differential phase equipment 116. The data input into the interface block 117 comprises real-time measurements on the active mobile units in communication with the base station.

Figure 5:
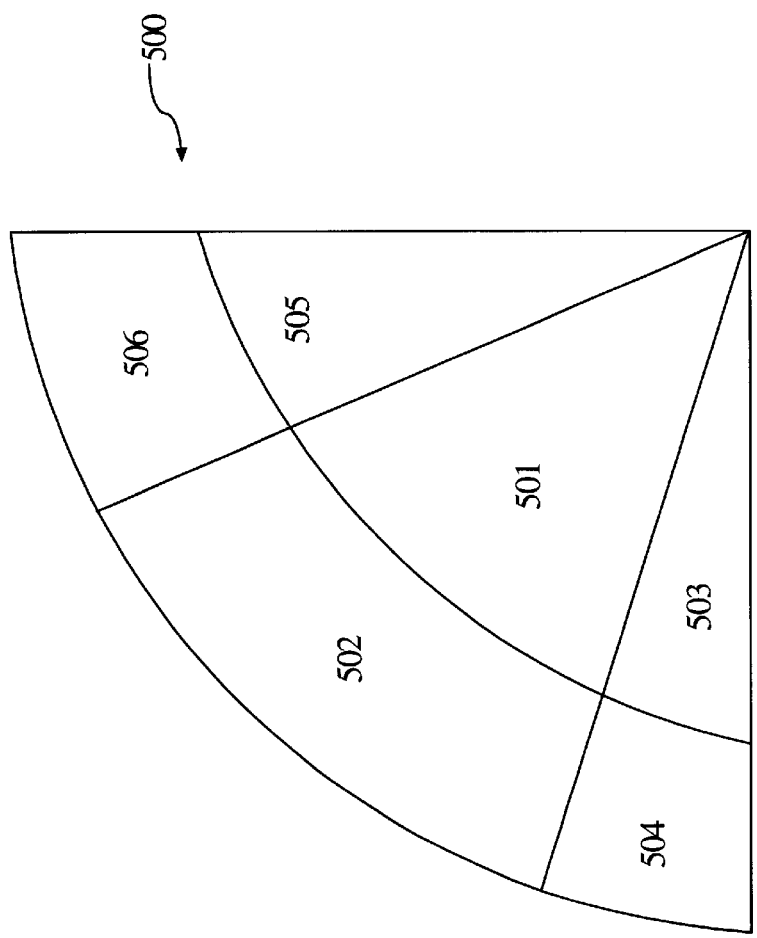
FIG. 5 is a plot of one sector of a base station operating area showing notionally six subregions of the serving sector.

The message extractors 114F and 114R provide to the interface block 117 the pilot signal set (i.e., the set of pilot signals that the mobile unit can detect, which may include the pilot signal for the serving sector of the serving base station, the pilot signal for other sectors of the serving base station, and the pilot signal for any neighbor base stations) for each mobile unit. The state of the pilot signal set is obtained by monitoring the pilot related messages being passed between the mobile and the base station and may include pilot power measurement messages. The pilot signal set provides an indication of the general area of a sector of the base station's operating area in which a particular mobile unit is located. Typically, a sector is divided into six subregions defined by the pilot signal set being used by a mobile unit in that particular subregion. With reference now to FIG. 5, a sector 500 of a base station operating area is depicted and is divided notionally into the six subregions based on the pilot signal set operating in each subregion as described below. For a mobile unit in the subregion 501, only the pilot signal for sector 500 from the serving base station, i.e., the base station whose sector is depicted in FIG. 5, is active. Therefore, the pilot signal set for a mobile unit in the subregion 501 will contain only the pilot signal for sector 500 from the serving base station. The pilot signal set for the subregion 502 will contain the pilot signal for sector 500 from the serving base station as well as the pilot signal for the base station serving the adjoining sector in the next adjacent cell (not shown in FIG. 5 for clarity) since a mobile unit operating in the subregion 502 will be operating in a soft hand-off mode between the serving base station and the base station for the adjacent cell. The pilot signal set for the subregion 503 will contain the pilot signal for sector 500 from the serving base station as well as the pilot signal from the serving base station for the sector adjacent subregion 503 since a mobile unit operating in the subregion 503 is in soft handoff between two sectors of the serving base station. Similarly, the pilot signal set for the subregion 505 will contain the pilot signal for the sector 500 from the serving base station as well as the pilot signal from the serving base station for the sector adjacent subregion 505. The pilot signal set for the subregion 504 will contain the pilot signal for the sector 500 from the serving base station, the pilot signal from the serving base station for the sector adjacent subregion 504 as well as the pilot signal for the base station serving the adjoining sector in the next adjacent cell. Likewise, the pilot signal set for the subregion 506 will contain the pilot signal for the sector 500 from the serving base station, the pilot signal from the serving base station for the sector adjacent subregion 506 as well as the pilot signal for the base station serving the adjoining sector in the next adjacent cell.

With reference returning to FIG. 3, serving and neighbor base station pilot signal status is derived from a demultiplexing operation performed by the forward and reverse channel equipment. The despreaders 113F and 113R each use a set of correlators ("fingers"). Typically, there are three correlators in a set. The correlators lock on to a transmitted signal and/or multipath generated replications of the transmitted signal and extract information relating to the number of components being despread, the time delay, and the gross power. Since the most stable multipath signals are typically generated by stationary reflectors in the propagation path, such as buildings and mountains, the extracted information is repeatable over time. Furthermore, the extracted information will vary from one location to another location due to the angles of incidence and reflection of the mobile unit's signal on the reflectors. Since stationary reflectors produce the most stable multipath signals, the result is a "map" of measurements of the extracted information throughout the operating area of the base station. Therefore, while the extracted information, on its own, is ambiguous in reference to the location of a mobile unit, the present invention exploits the repeatability of this information in order to obtain a geolocation for the mobile unit.

The time delay equipment 115 is used to determine a range from the base station to a mobile unit. The result is a range ring about the base station. The range ring is a locus of possible locations for the mobile unit based solely on the determined range from the base station. Once a call initiation from a mobile unit is detected, the time delay equipment makes a ranging estimate by known methods. One method would include synchronizing with GPS time and measuring reverse traffic channel signaling to estimate range. Another method would include measuring a two-way ranging by comparing the time of transmitting a message on a forward channel to the time of receipt of a responding message on the reverse channel.

The differential phase equipment 116 is used to determine a phase difference of a reverse traffic waveform as it is received by the randomly-located antennas at the base station. The randomly-located antennas are typically antennas that already existed at the base station prior to adding the geolocation overlay equipment and are random in the sense that the antennas are not spaced at calibrated intervals. Since the differential phase measurement being taken uses these randomly-located antennas, the resulting lines of bearing are an ambiguous set of possible radial lines of location from the base station. However, the differential phase measurements are repeatable, a property which the present invention exploits. This technique is different than the aforementioned techniques for direction finding using a calibrated array of antennas. The technique of the present invention yields an ambiguous solution whereas the aforementioned direction finding techniques yield a unique solution for differential phase measurements and that unique solution is used to solve a geometric calculation to locate the mobile unit. The technique of the present invention uses the repeatability of the ambiguous differential phase measurements to compare the real-time measurements taken from a mobile unit with a set of reference measurements as will be described below.

The Interface block 117 assembles the real time data and measurements received from the various inputs shown in FIG. 3 and as described above and sends this information to the Matches and Quality block 118. The Matches and Quality block 118 compares the real-time data from the Interface block 117 to historical reference data, shown as the A Priori Geographic Calibration Data 500, contained in the Database 400, which will be described below. The Matches and Quality block 118 finds the best match between the real-time data and the reference data and forwards the best results of the match, which may be a single match or multiple matches, to the Location history Filter 119. The Location History Filter 119 analyzes the match data with historical position information for the mobile unit being geolocation as well as static information such as road systems, buildings, and other geomorphological data.

Figure 6:
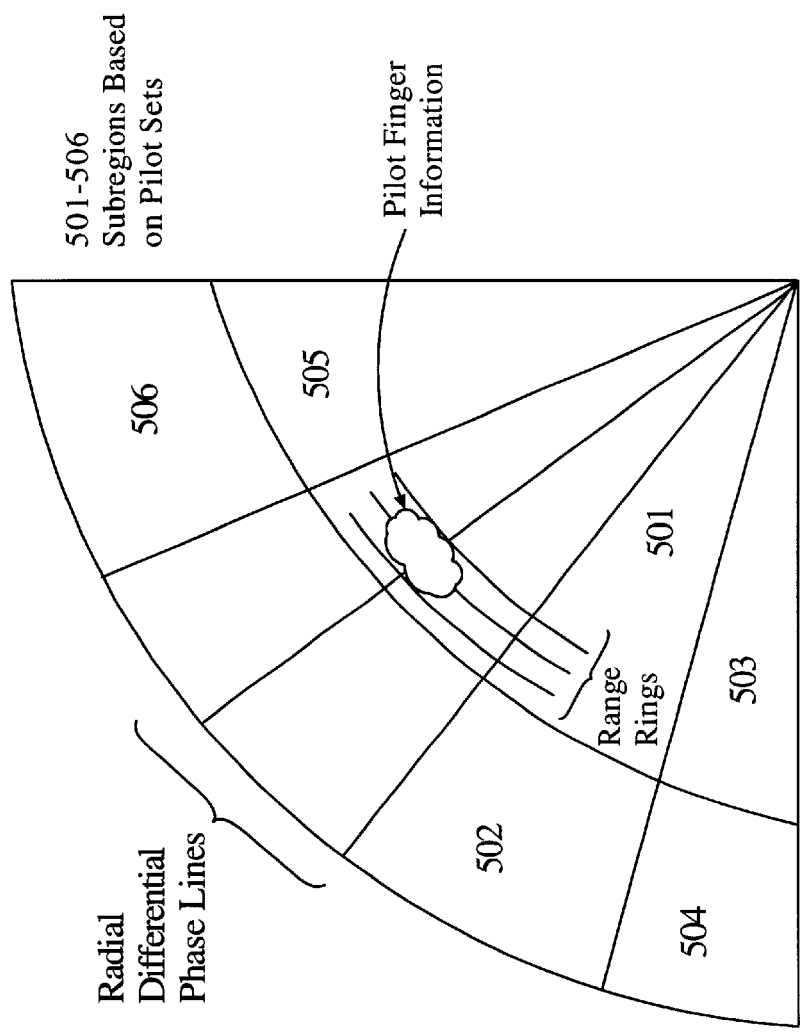
FIG. 6 is a plot of one sector of a base station operating area showing a grid of ambiguity space determined by range rings, radial lines of bearing, pilot sets, and pilot finger data.

The A Priori Geographic Calibration Data 500 is determined by one of various known techniques, such as driving a test unit throughout the operating area of the base station where the location of the test unit and the time of test unit transmissions are accurately known by standard means in the art. The multipath states, or pilot finger states, would be collected with a spatial resolution in the range of 50 square meters to 100 square meters. As the test unit is driven through the operating area, the parameters indicated above for geolocation are measured at the base station. The location of the test unit and the measured parameters are combined through common time stamps at the test unit and the base station. The result is a grid reflecting the ambiguity space created by pilot sets, range rings, radial differential phase lines, and pilot fingers, as shown partially in FIG. 6.

Figure 4:
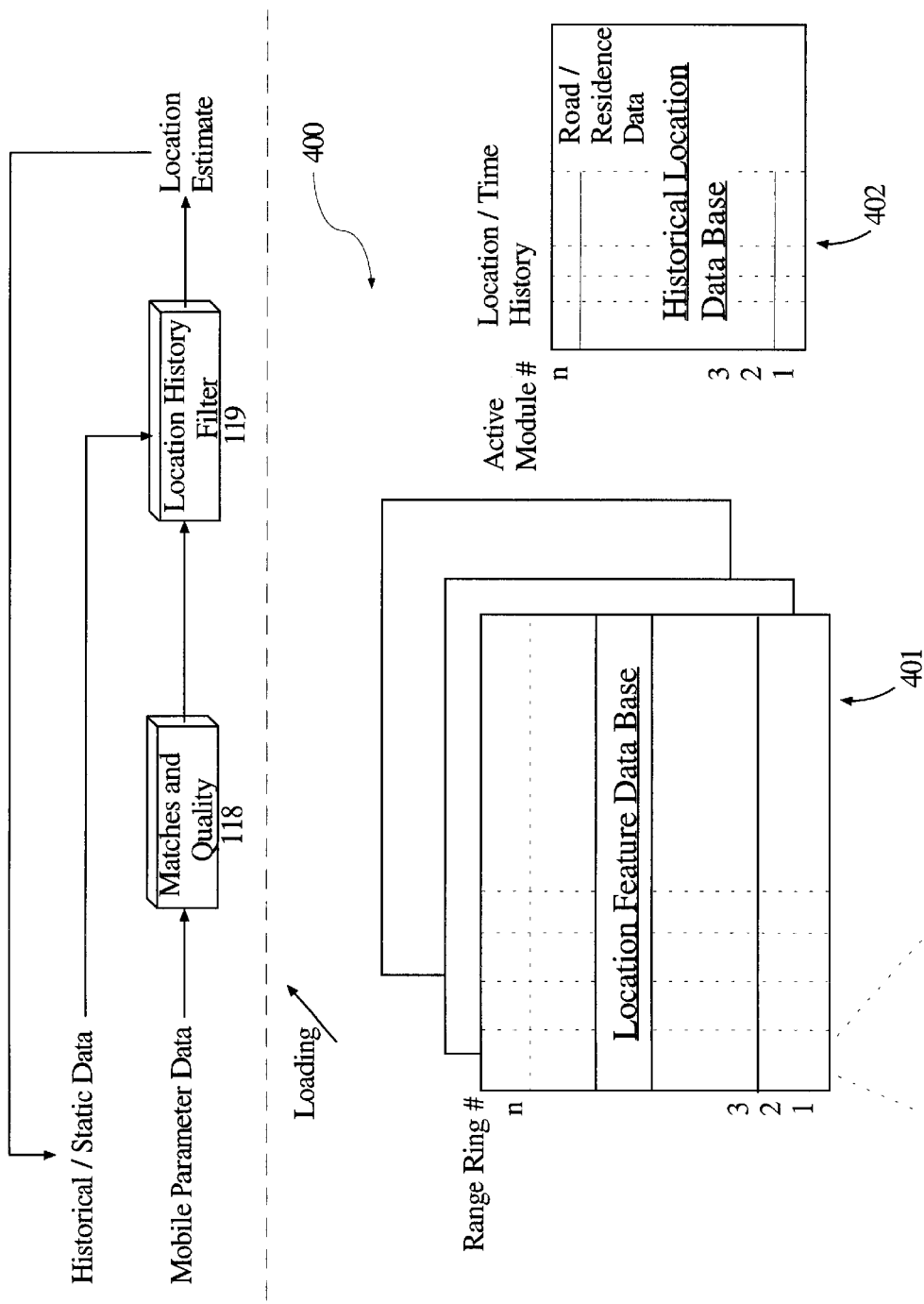
FIG. 4 is a pictorial view of the database structures of the invention.

With reference now to FIG. 4, functional elements of the Database block 400 in FIG. 3 are depicted. A Location Feature Database 401 includes reference geolocation information comprising pilot signal sets, radial differential phase lines, and pilot finger data. This information is the A Priori Calibration Data 500 and is determined by the test unit drive method described above. The database is indexed by range rings which point to a row in the database. The pilot sets, radial differential phase lines, and pilot finger measurements are the set of potential match columns. Real-time data from a mobile unit are input to the Matches and Quality block 118 which compares the real-time data to the reference data in the Location Feature Database 401. The best match candidate set of locations are passed from the Matches and Quality block 118 to the Location History Filter 119. The location History Filter 119 uses the Historical Location Database 402 to compare the best match candidates to the historical location of the mobile unit being geolocated. Recent past locations for a mobile unit are useful in resolving the current geolocation of that mobile unit. Additionally, the Location History Filter may use static and geomorphological data to further refine the geolocation of the mobile unit. The static and geomorphological data may be derived from other known database information, such as terrain maps, road maps, etc. The geolocation estimate of the mobile unit is then stored so as it will be available as historical data for later geolocation evolutions.

Returning now to FIG. 1, the Control and Interface Subsystem 120 resident at the mobile switching center 130 serves as a communications, control, and interfacing hub for the geolocation overlay. The Control and Interface Subsystem may function to cross check and correct geolocation estimates for mobile units in soft handoff between various base stations. For example, two base stations which are engaged in soft handoff of a mobile unit may independently determine a geolocation estimate for the mobile unit. The Control and Interface Subsystem 120 may compare the independent geolocation estimates and form a more accurate and consistent estimate using functionality similar to that used in the Location History Filter 119.

Figure 7:
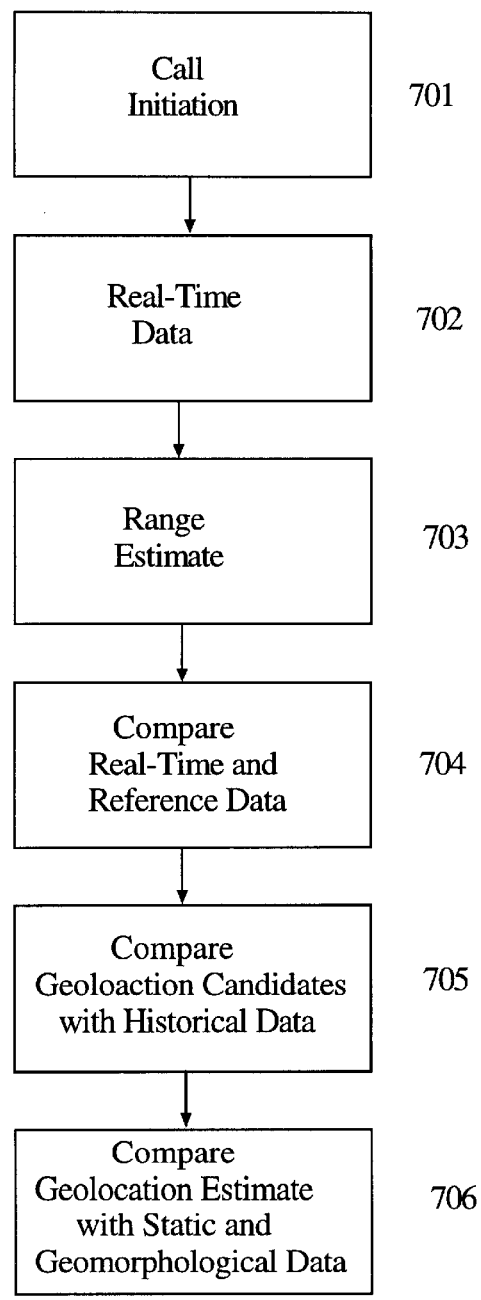
FIG. 7 is a block diagram indicating the method of the present invention.

With reference now to FIG. 7, a block diagram flow chart showing the high-level steps in the inventive method is depicted. The geolocation estimating process begins when the Location Finding Subsystem 110 detects call initiations at the base station to which it is attached or call hand-overs to the base station in Step 701. This step is performed by, for example, monitoring the pilot, sync, paging, and access channels in the mobile telecommunication network or by interfacing with the base station to derive this information. In Step 702, real-time data is measured for differential phase, pilot signal sets, and pilot finger data as previously described. The geolocation system then performs a range estimate in Step 703 as previously described. The real-time data is then compared to the a priori reference data in Step 704. The resulting geolocation candidates are further compared in Step 705 with historical geolocation data for the mobile unit. The resulting geolocation estimate may be further refined by comparing the estimate to static and geomorphological data in Step 706.

While preferred embodiments of the present invention have been described, it is to be understood that the embodiments described are illustrative only and that the scope of the invention is to be defined solely by the appended claims when accorded a full range of equivalence, many variations and modifications naturally occurring to those of skill in the art from a perusal hereof

What is claimed is:

1. A method for geolocating a mobile unit from a single base station having a plurality of randomly located antennas wherein the base station and mobile unit are receiving, one from the other, communication signals and pilot signals in accordance with a known air interface protocol comprising the steps of:

(a) providing a database of plural sets of measurements selected from the group consisting of reference ambiguous lines of bearing, reference pilot signal data, and reference pilot finger data, wherein said database is indexed by range from the base station and angle of bearing from the base station;

(b) determining a set of real-time measurements selected from the group consisting of real-time ambiguous lines of bearing, real-time pilot signal data, and real-time pilot finger data;

(c) determining an estimated range of the mobile unit from the base station; and (d) comparing the set of real-time measurements with the sets of reference measurements to thereby determine the range and bearing of the mobile unit from the base station so as to geolocate the mobile unit.

2. The method of claim 1 wherein the database includes plural sets of measurements comprising reference ambiguous lines of bearing, reference pilot signal data, and reference pilot finger data, and wherein said plural sets of measurements for said database are obtained by:

(i) selectively locating a test unit at a plurality of known geographic locations within the operating area of the base station;

(ii) determining the reference ambiguous lines of bearing by:

(1) receiving at a subset of the plurality of randomly located antennas at the base station a communication signal transmitted from the test unit;

(2) measuring the phase of the received communication signal at each of the antennas in the subset; and (3) determining the difference in phase between pairs of antennas in the subset to thereby determine the reference ambiguous lines of bearing from the base station to the mobile unit;
(iii) determining the reference pilot signal data by:
(1) receiving at the base station a pilot signal transmitted from the test unit; and
(2) detecting at the base station the pilot signal data contained within said pilot signal to thereby determine the set of reference pilot signal data; and
(iv) determining the reference pilot finger data by:
(1) receiving at the base station a communication signal transmitted from the test unit;
(2) despreading at the base station the communication data contained within said communication signal; and
(3) extracting the pilot finger data from said communication data to thereby determine the set of reference pilot finger data.

3. The method of claim 2 wherein the step of determining an estimated range of the mobile unit from the base station includes a two-way ranging estimate.

4. The method of claim 3 wherein the step of determining a set of real-time measurements includes the steps of:
(i) receiving at a subset of the plurality of randomly located antennas at the base station a communication signal and a pilot signal transmitted from the mobile unit;
(ii) measuring the phase of the received communication signal at each of the antennas in the subset and determining the difference in phase between pairs of antennas in the subset to thereby determine the real-time ambiguous lines of bearing from the base station to the mobile unit;
(iii) detecting the pilot signal data contained within said received communication signal to thereby determine the set of real-time pilot signal data; and
(iv) despreading the communication data contained within said received communication signal to thereby determine the set of real-time pilot finger data.

5. The method of claim 1 wherein the known air interface is code division multiple access.

6. The method of claim 5 wherein the code division multiple access air interface adheres to the IS-95/J-STD-08 protocol.

7. The method of claim 5 wherein the code division multiple access air interface adheres to the 1XRTT protocol.

8. The method of claim 5 wherein the code division multiple access air interface adheres to the 3XRTT protocol.

9. The method of claim 1 wherein the known air interface is wideband code division multiple access.

10. The method of claim 1 wherein the known air interface is time division multiple access.

11. The method of claim 10 wherein the time division multiple access air interface adheres to the Global System for Mobile Communications ("GSM") protocol.

12. The method of claim 10 wherein the time division multiple access air interface adheres to the IS-136 protocol.

13. The method of claim 1 wherein steps (c) and (d) are repeated a predetermined number of iterations so as to obtain a time-history of geolocation information for the mobile unit.

14. The method of claim 13 including the additional step of storing the time history of geolocation information.

15. The method of claim 14 wherein current geolocation information is compared to stored geolocation information to thereby refine the geolocation of the mobile unit.

16. The method of claim 14 wherein the time history of geolocation information is compared to predetermined static information to thereby refine the geolocation information of the mobile unit.

17. The method of claim 2 wherein the number of randomly located antennas is six.

18. The method of claim 2 wherein said base station is included in a pattern of base stations wherein the operating area of ones of the base stations in said pattern of base stations is divided into three sectors and wherein each sector is provided with a unique pilot signal from its associated base station.

19. The method of claim 18 wherein each sector is divided into N sub-regions each with a unique pilot signal set.

20. The method of claim 19 wherein said unique set of pilot signal data comprises pilot signals observable by a mobile unit located within said sub-region.

21. The method of claim 20 wherein said pilot signal data includes pilot power measurement messages.

22. The method of claim 20 wherein said pilot signal data includes timing measurement messages.

23. The method of claim 19 wherein N is six.

24. The method of claim 4 wherein despreading the communication data signal in step (iv) includes the use of a correlator to receive a direct path signal and one or more multipath signals of the communication data signal.

25. The method of claim 24 wherein the real-time pilot finger data comprises:
(a) the number of signal elements being despread;
(b) the time delay between receipt of said direct path signal and ones of said one or more multipath signals; and
(c) power level of the mobile unit.

26. In a method for geolocating a mobile unit within the operating area of a single base station having a plurality of randomly located antennas wherein a range estimate of the mobile unit from the base station is available and wherein the base station and mobile unit are receiving, one from the other, communication signals and pilot signals in accordance with a known air interface protocol, the improvement including the steps of:
(a) providing a database comprising plural sets of reference ambiguous lines of bearing indexed by range from the base station and angle of bearing from the base station, obtained by:
(i) selectively locating a test unit at a plurality of known geographic locations within the operating area of the base station;
(ii) receiving at a subset of the plurality of randomly located antennas at the base station a communication signal transmitted from the test unit;
(iii) measuring the phase of the received communication signal at each of the antennas in the subset; and
(iv) determining the difference in phase between pairs of antennas in the subset to thereby determine the reference ambiguous lines of bearing from the base station to the mobile unit;
(b) determining a set of real-time ambiguous lines of bearing for the mobile unit by:
(i) receiving at a subset of the plurality of randomly located antennas at the base station a communication signal transmitted from the mobile unit;
(ii) measuring the phase of the received communication signal at each of the antennas in the subset; and
(iii) determining the difference in phase between pairs of antennas in the subset to thereby determine the real-time ambiguous lines of bearing from the base station to the mobile unit; and (c) comparing the set of real-time ambiguous lines of bearing with the sets of reference ambiguous lines of bearing in the database to thereby determine the range and bearing of the mobile unit from the base station so as to geolocate the mobile unit.

27. The method of claim 26 wherein the operating area of the single base station is divided into three sectors.

28. The method of claim 26 wherein the number of randomly located antennas is six.

29. The method of claim 26 wherein the range estimate of the mobile unit from the base station is a two-way ranging estimate.

30. The method of claim 26 wherein the known air interface is code division multiple access.

31. The method of claim 30 wherein the code division multiple access air interface adheres to the IS-95/J-STD-08 protocol.

32. The method of claim 30 wherein the code division multiple access air interface adheres to the 1XRTT protocol.

33. The method of claim 30 wherein the code division multiple access air interface adheres to the 3XRTT protocol.

34. The method of claim 26 wherein the known air interface is wideband code division multiple access.

35. The method of claim 26 wherein the known air interface is time division multiple access.

36. The method of claim 35 wherein the time division multiple access air interface adheres to the Global System for Mobile Communications ("GSM") protocol.

37. The method of claim 35 wherein the time division multiple access air interface adheres to the IS-136 protocol.

38. The method of claim 26 wherein steps (b) and (c) are repeated a predetermined number of iterations so as to obtain a time-history of geolocation information for the mobile unit.

39. The method of claim 38 including the additional step of storing the time history of geolocation information.

40. The method of claim 39 wherein current geolocation information is compared to stored geolocation information to thereby refine the geolocation of the mobile unit.

41. The method of claim 39 wherein the time history of geolocation information is compared to predetermined static information to thereby refine the geolocation information of the mobile unit.

42. In a method for geolocating a mobile unit from a serving base station located within a pattern of base stations wherein a range estimate of the mobile unit from the serving base station is available, and wherein the serving base station and the mobile unit are receiving, one from the other, communication signals and pilot signals in accordance with a known air interface protocol, and wherein the mobile unit is detecting a pilot signal transmitted from ones of the base stations in the pattern of base stations, the improvement including the steps of:

(a) providing a database comprising plural sets of reference pilot signal data indexed by range from the serving base station and angle of bearing from the serving base station, obtained by:
  (i) selectively locating a test unit at a plurality of known geographic locations within the operating area of the serving base station;
  (ii) receiving at the serving base station a pilot signal transmitted from the test unit; and
  (iii) detecting at the serving base station the pilot signal data contained within said pilot signal to thereby determine the set of reference pilot signal data;

(b) determining a set of real-time pilot signal data for the mobile unit by:
  (i) receiving at the serving base station a pilot signal transmitted from the mobile unit; and
  (ii) detecting at the serving base station the pilot signal data contained within said pilot signal to thereby determine the set of real-time pilot signal data; and (c) comparing the set of real-time pilot signal data with the sets of reference pilot signal data to thereby determine the range and bearing of the mobile unit from the serving base station so as to geolocate the mobile unit.

43. The method of claim 42 wherein the operating area of each base station in the pattern of base stations is divided into three sectors whereby each base station provides a unique pilot signal for each of the three sectors in its operating area.

44. The method of claim 43 wherein each sector is divided into N sub-regions each with a unique set of pilot signal data.

45. The method of claim 44 wherein said unique set of pilot signal data comprises pilot signals observable by a mobile unit located within said sub-region.

46. The method of claim 45 wherein said pilot signal data includes pilot power measurement messages.

47. The method of claim 44 wherein N is six.

48. The method of claim 42 wherein the range estimate of the mobile unit from the base station is a two-way ranging estimate.

49. The method of claim 42 wherein the known air interface is code division multiple access.

50. The method of claim 49 wherein the code division multiple access air interface adheres to the IS-95/J-STD-08 protocol.

51. The method of claim 49 wherein the code division multiple access air interface adheres to the 1XRTT protocol.

52. The method of claim 49 wherein the code division multiple access air interface adheres to the 3XRTT protocol.

53. The method of claim 42 wherein the known air interface is wideband code division multiple access.

54. The method of claim 42 wherein the known air interface is time division multiple access.

55. The method of claim 54 wherein the time division multiple access air interface adheres to the Global System for Mobile Communications ("GSM") protocol.

56. The method of claim 54 wherein the time division multiple access air interface adheres to the IS-136 protocol.

57. The method of claim 42 wherein steps (b) and (c) are repeated a predetermined number of iterations so as to obtain a time-history of geolocation information for the mobile unit.

58. The method of claim 57 including the additional step of storing the time history of geolocation information.

59. The method of claim 58 wherein current geolocation information is compared to stored geolocation information to thereby refine the geolocation of the mobile unit.

60. The method of claim 58 wherein the time history of geolocation information is compared to predetermined static information to thereby refine the geolocation information of the mobile unit.

61. In a method for geolocating a mobile unit within the operating area of a single base station wherein a range estimate of the mobile unit from the base station is available and wherein the base station and mobile unit are receiving, one from the other, communication signals and pilot signals in accordance with a known air interface protocol requiring spreading, the improvement including the steps of:

(a) providing a database comprising plural sets of reference pilot finger data indexed by range from the base station and angle of bearing from the base station, obtained by:
- (i) selectively locating a test unit at a plurality of known geographic locations within the operating area of the base station;
- (ii) receiving at the base station a communication signal transmitted from the test unit; and
- (iii) despreading at the base station the communication data contained within said test unit communication signal; and
- (iv) extracting the pilot finger data from said test unit communication data to thereby determine the set of reference pilot finger data;

(b) determining a set of real-time pilot finger data by:
- (i) receiving at the base station a communication signal transmitted from the mobile unit; and
- (ii) despreading at the base station the communication data contained within said mobile unit communication signal; and
- (iii) extracting the pilot finger data from said mobile unit communication data to thereby determine the set of real-time pilot finger data; and (c) comparing the set of real-time pilot finger data with the sets of reference pilot finger data to thereby determine the range and bearing of the mobile unit from the base station so as to geolocate the mobile unit.

62. The method of claim 61 wherein despreading the communication data signal in steps (a)(iii) and (b)(ii) include the use of a correlator to receive a direct path signal and one or more multipath signals of the communication data signal.

63. The method of claim 62 Wherein the real-time pilot finger data comprises:
- (a) the number of signal elements being despread;
- (b) the time delay between receipt of said direct path signal and ones of said one or more multipath signals;
- (c) power level of the mobile unit; and
- (d) timing measurements.

64. The method of claim 61 wherein the range estimate of the mobile unit from the base station is a two-way ranging estimate.

65. The method of claim 61 wherein the known air interface is code division multiple access.

66. The method of claim 65 wherein the code division multiple access air interface adheres to the IS-95/J-STD-08 protocol.

67. The method of claim 65 wherein the code division multiple access air interface adheres to the 1XRTT protocol.

68. The method of claim 65 wherein the code division multiple access air interface adheres to the 3XRTT protocol.

69. The method of claim 61 wherein the known air interface is wideband code division multiple access.

70. The method of claim 61 wherein steps (b) and (c) are repeated a predetermined number of iterations so as to obtain a time-history of geolocation information for the mobile unit.

71. The method of claim 70 including the additional step of storing the time history of geolocation information.

72. The method of claim 71 wherein current geolocation information is compared to stored geolocation information to thereby refine the geolocation of the mobile unit.

73. The method of claim 71 wherein the time history of geolocation information is compared to predetermined static information to thereby refine the geolocation information of the mobile unit.

74. A system for geolocating a mobile unit from a single base station having a plurality of randomly located antennas wherein the base station and mobile unit are receiving, one from the other, communication signals and pilot signals in accordance with a known air interface protocol comprising: database means for storing plural sets of measurements selected from the group consisting of reference ambiguous lines of bearing, reference pilot signal data, and reference pilot finger data, wherein said database is indexed by range from the base station and angle of bearing from the base station; measurement means for determining a set of real-time measurements selected from the group consisting of real-time ambiguous lines of bearing, real-time pilot signal data, and realtime pilot finger data; and range estimating means for estimating the range of the mobile unit from the base station; comparing means for comparing the set of real-time measurements with the sets of reference measurements to thereby determine the range and bearing of the mobile unit from the base station so as to geolocate the mobile unit.

* * * * *